(12) United States Patent
Su et al.

(10) Patent No.: US 10,556,353 B2
(45) Date of Patent: Feb. 11, 2020

(54) ROBOT ARM CONTROL DEVICE AND ROBOT ARM OPERATION METHOD

(71) Applicant: INDUSTRIAL TECHNOLOGY RESEARCH INSTITUTE, Hsinchu (TW)

(72) Inventors: Jui-Yiao Su, New Taipei (TW); Yan-Chen Liu, Taipei (TW); Chang-Yi Chen, Hsinchu (TW); Ching-Shun Chen, Changhua County (TW); Wen-Ching Ko, Kaohsiung (TW); Hung-Hsiu Yu, Changhua (TW); Jwu-Sheng Hu, Zhubei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 373 days.

(21) Appl. No.: 15/393,602

(22) Filed: Dec. 29, 2016

(65) Prior Publication Data

US 2018/0043549 A1 Feb. 15, 2018

Related U.S. Application Data

(60) Provisional application No. 62/374,074, filed on Aug. 12, 2016.

(30) Foreign Application Priority Data

Nov. 25, 2016 (TW) .............................. 105138872 A

(51) Int. Cl.
*B25J 19/06* (2006.01)
*B25J 13/08* (2006.01)
(Continued)

(52) U.S. Cl.
CPC ............... *B25J 19/063* (2013.01); *B25J 9/12* (2013.01); *B25J 9/1638* (2013.01); *B25J 9/1641* (2013.01);
(Continued)

(58) Field of Classification Search
CPC ........ B25J 19/063; B25J 19/06; B25J 13/081; B25J 9/1638; B25J 9/12; B25J 9/1676;
(Continued)

(56) References Cited

U.S. PATENT DOCUMENTS 5,373,747 A 12/1994 Ogawa et al.
5,542,036 A * 7/1996 Schroeder ............... G06T 17/10
345/424

(Continued)

FOREIGN PATENT DOCUMENTS

CN 103347662 A 10/2013
CN 103386684 A 11/2013
(Continued)

OTHER PUBLICATIONS

Vasic, et al., "Safety Issues in Human-Robot Interactions", 2013 IEEE International Conference on Robotics and Automation (ICRA), May 6-10, 2013, pp. 197-204.
(Continued)

*Primary Examiner* — Jaime Figueroa
(74) *Attorney, Agent, or Firm* — Muncy, Geissler, Olds & Lowe, P.C.

(57) ABSTRACT

A robot arm control device includes a pressure sensing module, a workspace defining module and a control module. The pressure sensing module, arranged on a robot arm, detects whether an object hits or touches the robot arm to switch the operating mode of the robot arm. The workspace defining module includes a sensing region arranged on a peripheral area around the robot arm. The workspace defin-
(Continued)

ing module determines whether the object enters an operating space according to the position of the object in the sensing region, and sets the working range and the working mode of the robot arm according to which operating space the object has entered. The control module, connected to the robot arm, the pressure sensing module and the workspace defining module, switches the operating mode and outputs a motor driving signal to the robot arm according to the working mode of the robot arm.

11 Claims, 4 Drawing Sheets

(51) Int. Cl.
*B25J 9/16* (2006.01)
*B25J 9/12* (2006.01)

(52) U.S. Cl.
CPC .......... *B25J 9/1676* (2013.01); *B25J 13/081* (2013.01); *B25J 13/084* (2013.01); *B25J 19/06* (2013.01); *G05B 2219/40201* (2013.01); *G05B 2219/40202* (2013.01)

(58) Field of Classification Search
CPC ................. B25J 13/084; B25J 9/1641; G05B 2219/40202; G05B 2219/40201
USPC ................................................ 700/245, 255
See application file for complete search history.

(56) References Cited

U.S. PATENT DOCUMENTS

| | | | | |
|---|---|---|---|---|
| 6,212,443 B1* | 4/2001 | Nagata | ................. | G05B 19/423 318/568.13 |
| 7,778,732 B2* | 8/2010 | Adachi | ................. | B25J 9/0003 318/568.12 |
| 8,315,735 B2* | 11/2012 | Nihei | .................... | B25J 9/1676 318/568.11 |
| 8,494,677 B2* | 7/2013 | Mizutani | ............. | G05B 19/423 700/245 |
| 8,731,276 B2* | 5/2014 | Mizutani | ................ | B25J 9/1676 345/633 |
| 8,855,815 B2* | 10/2014 | Mizutani | ............. | G05B 19/423 318/560 |
| 9,043,025 B2 | 5/2015 | Brooks et al. | | |
| 9,329,587 B2* | 5/2016 | Fudaba | ..................... | B25J 3/04 |
| 9,403,276 B2 | 8/2016 | Nishimura et al. | | |
| 9,427,871 B2* | 8/2016 | Ciarelli | .................... | F16P 3/14 |
| 9,452,531 B2* | 9/2016 | Kikkeri | ................. | B25J 9/1676 |
| 9,475,200 B2* | 10/2016 | Schlaich | ................ | B25J 9/1676 |
| 9,804,576 B2* | 10/2017 | Scott | ...................... | B25J 9/1676 |
| 9,962,836 B2* | 5/2018 | Zunke | ................. | B25J 19/0095 |
| 2002/0186299 A1* | 12/2002 | Cofer | ...................... | F16P 3/142 348/152 |
| 2003/0137219 A1* | 7/2003 | Heiligensetzer | ....... | B25J 13/084 310/328 |
| 2003/0146898 A1* | 8/2003 | Kawasaki | ................ | B25J 13/02 345/156 |
| 2004/0148039 A1* | 7/2004 | Farchmin | ............. | G05B 19/122 700/79 |
| 2004/0218317 A1* | 11/2004 | Kawazu | ............... | G05B 19/058 361/1 |
| 2006/0049939 A1* | 3/2006 | Haberer | .................. | F16P 3/142 340/541 |
| 2008/0021597 A1* | 1/2008 | Merte | ..................... | F16P 3/141 700/255 |
| 2008/0161970 A1* | 7/2008 | Adachi | .................. | B25J 9/0003 700/253 |
| 2010/0168950 A1* | 7/2010 | Nagano | .................. | B25J 9/1666 701/25 |
| 2010/0198365 A1* | 8/2010 | Kawabata | ............. | G01S 7/4812 700/12 |
| 2011/0071664 A1 | 3/2011 | Linn et al. | | |
| 2014/0067121 A1* | 3/2014 | Brooks | .................. | B25J 9/1676 700/255 |
| 2014/0222207 A1* | 8/2014 | Bowling | ................ | A61B 34/32 700/261 |
| 2014/0277723 A1 | 9/2014 | Nishimura et al. | | |
| 2015/0049911 A1* | 2/2015 | Doettling | ................ | F16P 3/142 382/103 |
| 2015/0137923 A1* | 5/2015 | van Ninhuijs | ........ | H01F 7/0231 335/306 |
| 2015/0158178 A1* | 6/2015 | Burmeister | ............ | B25J 9/1676 382/203 |

FOREIGN PATENT DOCUMENTS

| | | |
|---|---|---|
| CN | 103495981 A | 1/2014 |
| CN | 101402202 B | 2/2014 |
| CN | 103170973 B | 3/2015 |
| CN | 104428107 A | 3/2015 |
| CN | 104602868 A | 5/2015 |
| DE | 19943318 A1 | 3/2001 |
| JP | H11231925 | 8/1999 |
| TW | I454350 | 10/2014 |
| WO | WO 2010/088934 A1 | 8/2010 |
| WO | WO 2014/008929 A1 | 1/2014 |
| WO | WO 2015/074841 A1 | 5/2015 |

OTHER PUBLICATIONS

Stengel, et al., "An Approach for Safe and Efficient Human-Robot Collaboration", SIAS 2010, 6 pages.

Eder et al., "Towards the Safety of Human-in-the-Loop Robotics: Challenges and Opportunities for Safety Assurance of Robotic Co-Workers," The 23$^{rd}$ IEEE International Symposium on Robot and Human Interactive Communication, Aug. 25-29, 2014, pp. 660-665.

Matthias, Bjorn, "Industrial Safety Requirements for Collaborative Robots and Applications," ERF 2014, Workshop, 46 pages.

\* cited by examiner

ROBOT ARM CONTROL DEVICE AND
ROBOT ARM OPERATION METHOD

This application claims the benefits of U.S. provisional application Ser. No. 62/374,074, filed Aug. 12, 2016 and Taiwan application Serial No. 105138872, filed Nov. 25, 2016, the disclosures of which are incorporated by references herein in its entirety.

TECHNICAL FIELD

The disclosure relates in general to a robot arm, and more particularly to a robot arm control device and a robot arm operating method.

BACKGROUND

As the robot technology is getting more and more matured, collaborative operation of multiple robot arms actively moving within a larger range has become possible. To implement the collaborative operation of multiple robot arms, collaborative control must be performed on the robot arms to avoid the robot arms having conflict of tasks and increase the efficiency.

Through the collaborative operation between the operator and the robot arms, the efficiency of the manufacturing process which involves high complexity or requires high flexibility can be increased, but at the same time the operator will face more hazards. Therefore, how to define the robot working space to avoid the operator being hurt by the robot arm during cooperative task has become more and more important to the manufacturing industries.

SUMMARY

The disclosure is directed to a robot arm control device and a robot arm operating method capable of assuring the safety and convenience during man-machine collaborative operation.

According to one embodiment, a robot arm control device including a pressure sensing module, a workspace defining module and a control module is provided. The pressure sensing module is arranged on a robot arm to detect whether an object hits or touches the robot arm so as to switch the operating mode of the robot arm. The workspace defining module includes a sensing region arranged on a peripheral area around the robot arm. The workspace defining module determines whether the object enters a predetermined operating space according to the position of the object in the sensing region, and sets the working range and the working mode of the robot arm according to which operating space the object has entered. The control module is connected to the robot arm, the pressure sensing module and the workspace defining module. The control module is used to switch the operating mode of the robot arm and output a motor driving signal to the robot arm according to the working mode of the robot arm.

According to another embodiment, a robot arm operating method is provided. The method includes following steps: arranging a sensing region on a peripheral area around a robot arm to detect the position of an object in the sensing region, and determining whether the object enters a predetermined operating space; setting the working range and the working mode of the robot arm according to which operating space the object has entered, and outputting a motor driving signal to the robot arm according to the working mode of the robot arm; arranging a pressure sensing module on the robot arm to detect whether the object hits or touches the robot arm; and emitting a stop signal to the robot arm to stop the robot arm if it is detected that the object hits the robot arm.

The above and other aspects of the disclosure will become better understood with regard to the following detailed description of the embodiment(s). The following description is made with reference to the accompanying drawings.

DETAILED DESCRIPTION

The present disclosure is described with a number of embodiments. However, the embodiments are for exemplification purpose only, not for limiting the scope of protection of the present disclosure.

Figure 1:
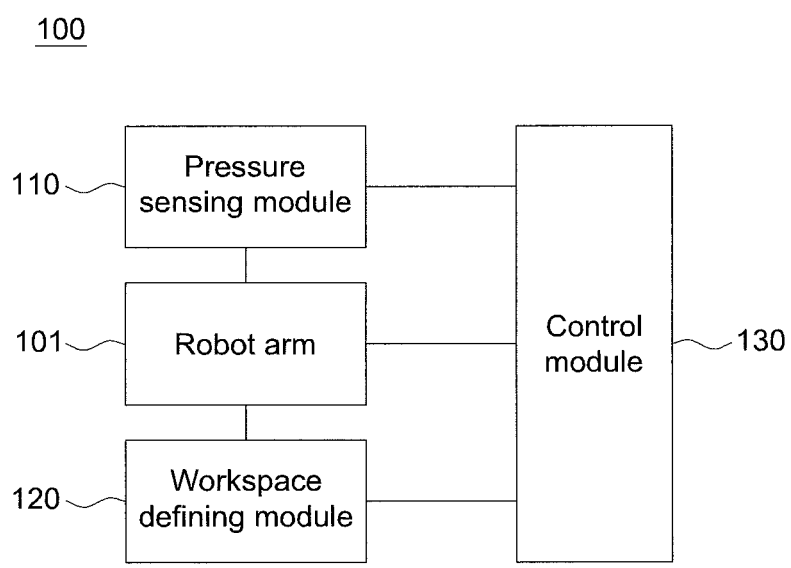
FIG. 1 is a block diagram of a robot arm control device according to an embodiment of the disclosure.
Figure 2:
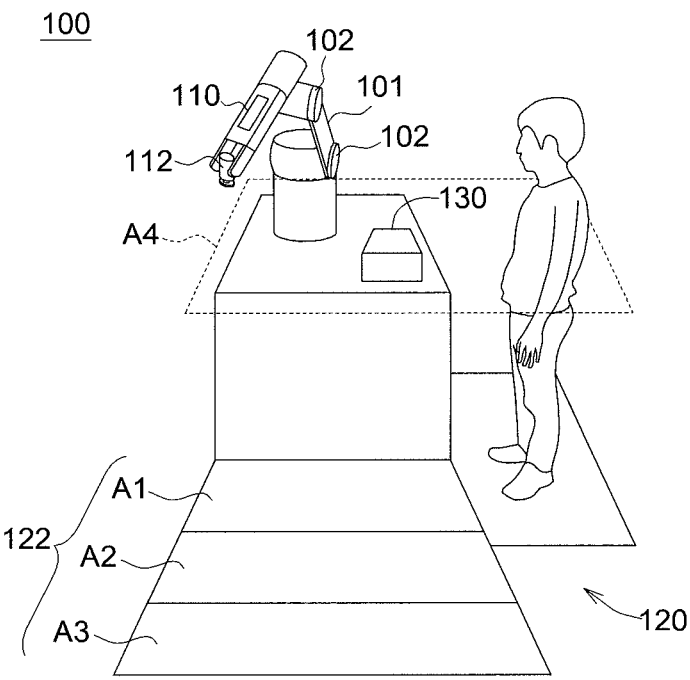
FIG. 2 is a 3D schematic diagram of a robot arm control device according to an embodiment of the disclosure.

Refer to FIGS. 1 and 2. The robot arm control device 100 according to an embodiment of the disclosure includes a pressure sensing module 110, a workspace defining module 120 and a control module 130. The pressure sensing module 110 is arranged on a robot arm 101. For example, the pressure sensing module 110 can be arranged at an end effector of the robot arm 101 or any portion of the robot arm 101 which can be hit by an object. In robotics, the end effector is a device at the end of the robot arm, designed to interact with the environment. The pressure sensing module 110 is used to detect whether an object hits or touches the robot arm 101. The object can be an operator or a machine operating in collaboration with the robot arm 101. The pressure sensing module 110 can be electro-mechanically integrated with the robot arm 101 and used as a tactile skin of the robot arm 101.

The workspace defining module 120 is used to set the working range and the working mode of the robot arm 101. The control module 130 is connected to the robot arm 101, the pressure sensing module 110 and the workspace defining module 120. The control module 130 switches the operating mode of the robot arm 101 and output a motor driving signal to the robot arm 101 according to the working mode of the robot arm 101.

For example, under a working mode, if no operator or object enters the working range of the robot arm 101, then the control module 130 operates the robot arm 101 normally according to the pre-determined parameter values (such as the torque, the speed or the moving trajectory); if an operator or an object enters a pre-determined one of the operating spaces A1-A3, then the workspace defining module 120 sets the working range and the working mode of the robot arm 101 according to which of the operating spaces A1-A3 that the operator or the object has entered. Meanwhile, the control module 130 operates the robot arm 101 according to the adjusted parameter values (such as the torque, the speed or the moving trajectory). On one hand, the working range of the robot arm 101 (or the moving trajectory) will be restricted to prevent the one of the operating spaces A1-A3 that the operator or the object has entered from being overlapped and collided. Also, the maximum moving speed or the maximum output torque of the robot arm 101 is limited to reduce the hazards when a collision happens.

Figure 3:
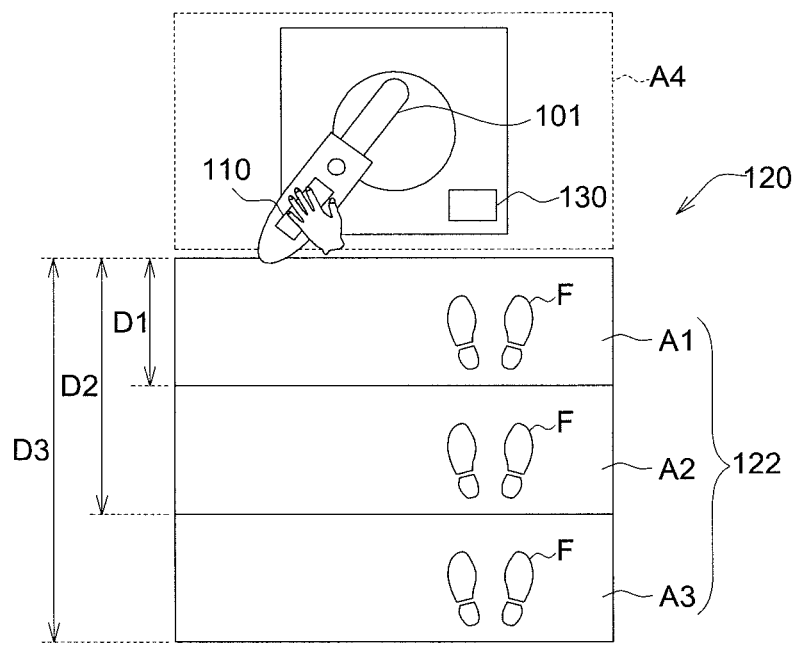
FIG. 3 is a schematic diagram of setting the workspace of a robot arm.

Refer to FIGS. 2 and 3. The workspace defining module 120 includes a sensing region 122, such as an array area formed by safety mats or pressure sensors. The sensing region 122 is arranged on a peripheral area around the robot arm 101, such as a peripheral ground surface, and can be divided into multiple operating spaces A1-A3 corresponding to different working modes (or different working parameters). In an embodiment, the sensing region 122 can be divided into three or more than three operating spaces A1-A3. The first operating space A1 is separated from the robot arm 101 by a first distance D1. The second operating space A2 is separated from the robot arm 101 by a second distance D2; the third operating space A3 is separated from the robot arm 101 by a third distance D3; the first distance D1 is smaller than the second distance D2; the second distance D2 is smaller than the third distance D3; and the rest can be obtained by the same analogy.

When an operator or an object enters the sensing region 122, the workspace defining module 120 determines whether the operator or the object enters a predetermined one of the operating spaces A1-A3 according to the position of the operator or the object in the sensing region 122 so as to adjust the parameter values of the robot arm 101. In an embodiment, the operating mode of the robot arm 101 can be divided into three modes: a low speed with low torque operating mode, a medium speed with medium torque operating mode and a high speed with high torque operating mode according to the parameter values, but the disclosure is not limited thereto.

For example, as indicated in FIG. 3, when the operator or the object (represented by footprint F) approaches to the robot arm 101 and separates from the robot arm 101 by a distance, the workspace defining module 120 sets the working range and the working mode of the robot arm 101 according to the relationship table of the separated distance-vs-speed of robot arm and/or the separated distance-vs-torque of robot arm 101. The closer to the robot arm 101 the operator or the object is, the larger the hazards and the probability of collision are. Therefore, the control module 130 controls the maximum moving speed or maximum output torque of the robot arm 101 according to the relationship table (such as the separated distance-vs-moving speed of robot arm and/or the separated distance-vs-output torque of robot arm) to reduce the hazards and probability of collision.

Under one of the above operating modes, when the operator hits the pressure sensing module 110 with his/her finger(s), the pressure sensing module 110 generates a sensing signal to the control module 130, which accordingly emits a stop signal to the robot arm 101 according to the sensing signal to stop the robot arm 101. When the robot arm 101 is at a stop mode, the control module 130 can switch the operating mode of the robot arm 101 to a lead-through mode and perform lead-through teaching or compliance teaching. Refer to FIG. 2. In another embodiment, the workspace defining module 120 further includes a collaborative workspace A4. For example, an image sensor is arranged on a peripheral area of the collaborative workspace A4 or a safety mat is arranged on the ground of the collaborative workspace A4. When an operator or an object enters the collaborative workspace A4, the control module 130 emits an operating signal to the robot arm 101 according to the sensing signal generated by the image sensor or the safety mat to stop the robot arm 101 or control the robot arm 101 to enter a lead-through mode.

Figure 4:
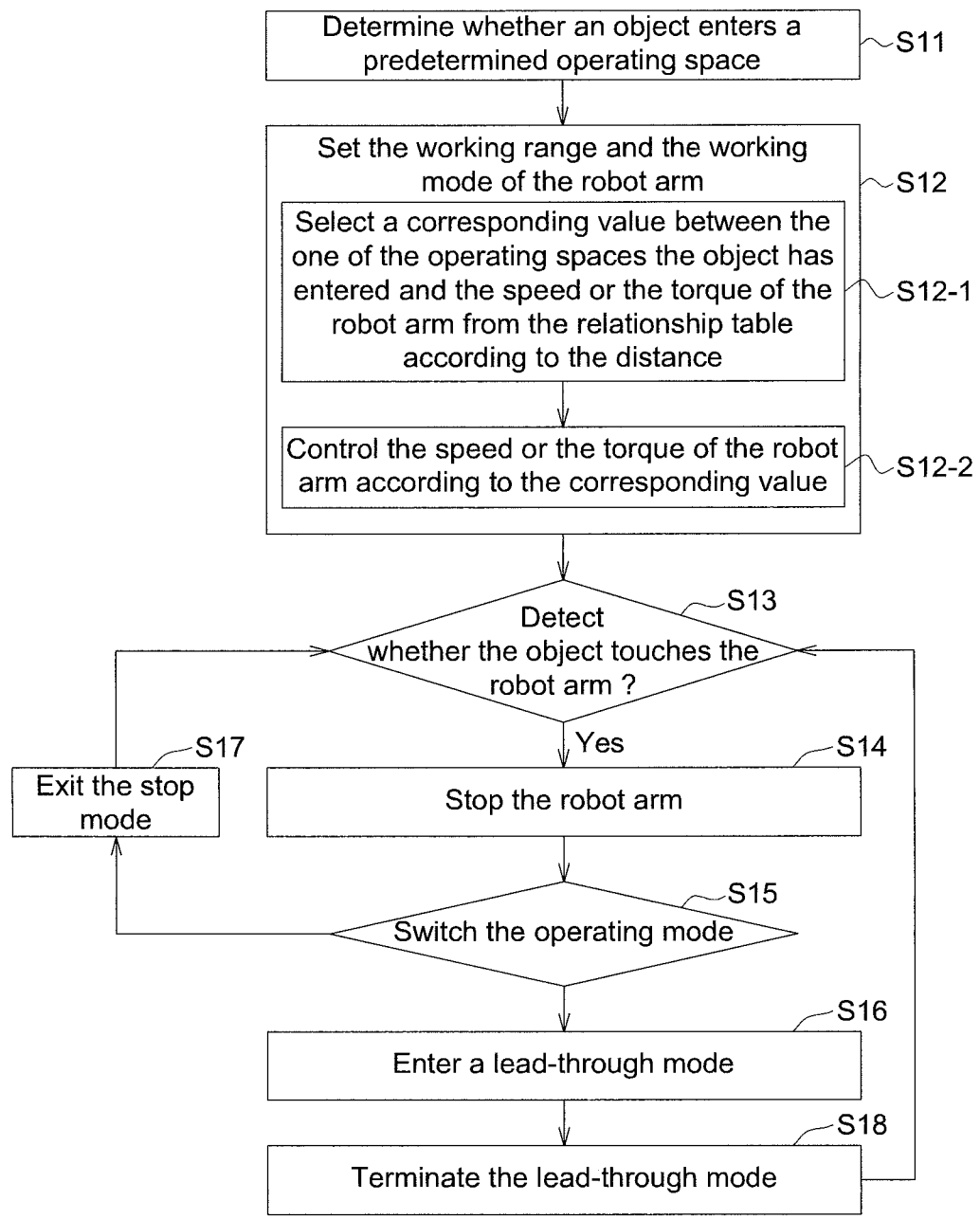
FIG. 4 is a flowchart of a robot arm operating method according to an embodiment of the disclosure.

Refer to FIG. 4. The operating method of the robot arm 101 according to an embodiment of the disclosure includes following steps: In step S11, a sensing region 122 is arranged on a peripheral area around the robot arm 101 to detect the position of the operator or the object in the sensing region 122, and whether the operator or the object enters a predetermined one of the operating spaces A1-A3 is determined. In step S12, the working range and the working mode of the robot arm 101 are set according to which of the operating spaces A1-A3 that the object has entered, and a motor driving signal to the robot arm 101 is outputted according to the working mode of the robot arm 101. In step S13, a pressure sensing module 110 is arranged on the robot arm 101 to detect whether the operator or the object hits or touches the robot arm 101. In step S14, if it is detected that the object hits the robot arm 101, a stop signal is emitted to the robot arm 101 to stop the robot arm 101. In step S15, when the robot arm 101 stops, the operating mode of the robot arm 101 is switched to select whether to enter a lead-through mode or to exit the stop mode. In step S17, when exiting the stop mode, the method returns to step S13 to detect whether the object hits or touches the robot arm 101. In step S16, when entering the lead-through mode, the robot arm 101 is controlled according to an operation command applied to a touch-sensing surface 112 of the end effector of the robot arm 101, and a set of motor torque signals capable of moving the robot arm 101 is generated according to the operation command. In step S18, when the robot arm 101 terminates the lead-through mode, the method returns to step S13 to detect whether the object hits or touches the robot arm 101.

In an embodiment, in step S12 of setting the working range and the working mode of the robot arm 101, a relationship table of operating spaces A1-A3 vs speed or torque of robot arm 101 is pre-stored in the control module 130. In other words, the relationship table contains the relationship between the operating space of the sensing region and speed of the robot arm 101, and contains the relationship between the operating space of the sensing region and torque of the robot arm 101. If it is determined that the operator or the object has entered one of the operating spaces A1-A3, then the method proceeds to step S12-1 and step S12-2. In step S12-1, a corresponding value between the one of the operating spaces A1-A3 that the object has entered and the speed or the torque of the robot arm 101 is selected from the relationship table according to the distance. In step S12-2, the maximum moving speed or the maximum output torque of the robot arm 101 is controlled according to the corresponding value. That is, in the present embodiment, when the operator or the object is closer to the robot arm 101, the moving speed or the output torque of the robot arm 101 can be reduced to be, for example, 80%, 50%, and 30% of the maximum moving speed or the maximum output torque according to the distance between the operator and the machine to reduce the hazards and the probability of collision. However, the disclosure is not limited thereto.

Figure 5:
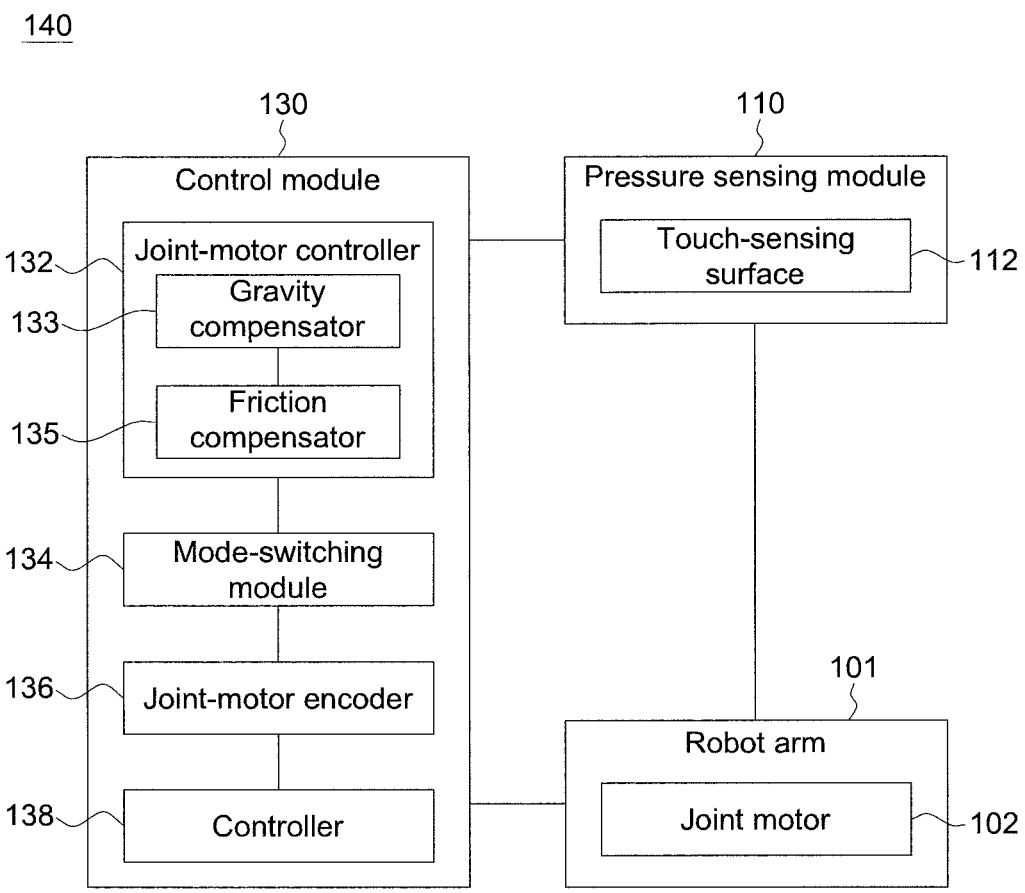
FIG. 5 is a block diagram of the operating system of a robot arm according to an embodiment of the disclosure.

Refer to FIG. 5. The operating system 140 of a robot arm according to an embodiment of the disclosure includes a pressure sensing module 110 and a control module 130. The pressure sensing module 110 is arranged on any portion or the end effector of a robot arm 101. The pressure sensing module 110 has a touch-sensing surface 112 (refer to FIG. 2) used to detect an operation command applied to the touch-sensing surface 112. The operation command can be realized by a point signal, a trace signal or in combination thereof generated when the operator's finger touches the touch-sensing surface 112. The touch-sensing surface 112 can be an array formed by pressure sensors to form a coordinate system. In the lead-through mode (refer to step S16 of FIG. 4), the control module 130 is used to receive at least a pressure sensing signal outputted by the touch-sensing surface 112 and output a motor driving signal to the robot arm 101 in response to the operation command.

The control module 130 includes a joint-motor controller 132, a mode-switching module 134, a plurality of joint-motor encoders 136 and a controller 138. The mode-switching module 134 is used to switch the operating mode of the robot arm 101 to select whether to enter a lead-through mode or to exit the stop mode (refer to step S15 of FIG. 4). Under the lead-through mode, the joint-motor controller 132 generates a set of motor torque signals capable of moving the robot arm 101 according to the operation command to control the torque of each joint motor 102.

Besides, the joint-motor encoders 136 are arranged on the joints of the robot arm 101. Under lead-through mode, the joint-motor encoders 136 generate a set of joint angle signals according to the moving trajectory of the robot arm 101 to record the gesture and azimuth of each joint. Additionally, the controller 138 is connected to the joint-motor encoders 136, and, under lead-through mode, the controller 138 records and stores the set of joint angle signals generated by the joint-motor encoders 136. When the moving trajectory of the robot arm 101 needs to be reproduced, the controller 138 converts the set of joint angle signals into the motor driving signal capable to restrict the moving trajectory of the robot arm 101.

In another embodiment, the joint-motor controller 132 further includes a gravity compensator 133, which calculates the gravity compensation torque applied to each robot arm according to the angle of each joint, the mass and length of each link of the robot arm, and the distances between the mass-centers of each link and joint. Furthermore, the joint-motor controller 132 further includes a friction compensator 135, which calculates the friction compensation torque applied to each joint according to the rotation speed of each joint of the robot arm 101.

It can be understood from above descriptions that the operator can apply a force for moving the robot arm 101 and feed the information of moving direction (the operation command) to the robot arm 101 through the pressure sensing module 110, and use the control module 130 to convert the information into the torque required at each joint of the robot arm 101 or compensate the torque (the gravity compensation torque or the friction compensation torque) so that the control module 130 can control the position and posture of each joint and realize the man-machine collaborative operation. Besides, when an operator or an object is close to the robot arm 101, the control module 130 can control the maximum moving speed or the maximum output torque of the robot arm 101 to reduce the hazards when a collision happens and assure the safety. Moreover, when the operator or the object hits the robot arm 101, the control module 130 emits a stop signal to the robot arm 101 to stop the robot arm 101, so that the operator can choose entering the lead-through mode to perform lead-through teaching or compliance teaching.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A robot arm control device, comprising:
a pressure sensing module arranged on a robot arm, wherein the pressure sensing module is used to detect whether an object hits or touches the robot arm so as to switch an operating mode of the robot arm;
a workspace defining module, comprising a sensing region formed by a mat or an array of pressure sensors and arranged on a peripheral area around the robot arm, wherein the workspace defining module determines whether the object enters a predetermined operating space according to a position of the object in the sensing region, and sets a working range and a working mode of the robot arm according to which operating space the object has entered; and
a control module connected to the robot arm, the pressure sensing module and the workspace defining module, wherein the control module is used to switch the operating mode of the robot arm and output a motor driving signal to the robot arm according to the working mode of the robot arm, wherein the control module comprises a joint-motor controller and a friction compensator, the friction compensator calculates a friction compensation torque applied to each joint according to a rotation speed of each joint of the robot arm when the joint-motor controller generates a set of motor torque signals for moving the robot arm according to an operation command.

2. The robot arm control device according to claim 1, wherein a relationship table containing the relationship between the operating space of the sensing region and speed of the robot arm, and containing the relationship between the operating space of the sensing region and torque of the robot arm is pre-stored in the workspace defining module, when the operating space the object has entered is separated from the robot arm by a distance, the workspace defining module selects a corresponding value between the operating space the object has entered and the speed or the torque of the robot arm from the relationship table according to the distance, and the control module controls a maximum moving speed or a maximum output torque of the robot arm according to the corresponding value.

3. The robot arm control device according to claim 1, wherein when the control module determines that the object hits or touches the pressure sensing module of the robot arm, the control module emits a stop signal to the robot arm to stop the robot arm.

4. The robot arm control device according to claim 3, wherein the control module comprises a mode-switching module, the mode-switching module is used to switch the operating mode of the robot arm to select whether to enter a lead-through mode or to exit a stop mode when the robot arm stops, and, under the lead-through mode, the pressure sensing module has a touch-sensing surface arranged on an end effector of the robot arm to detect the operation command applied to the touch-sensing surface.

5. The robot arm control device according to claim 4, wherein the control module comprises a plurality of joint-motor encoders arranged on joints of the robot arm, and the joint-motor encoders, under the lead-through mode, generate a set of joint angle signals according to the moving trajectory of the robot arm.

6. The robot arm control device according to claim 5, wherein the control module comprises a controller, which, under the lead-through mode, records and stores the set of joint angle signals generated by the joint-motor encoders, and the controller converts the set of joint angle signals into the motor driving signal for reproducing the moving trajectory of the robot arm.

7. The robot arm control device according to claim 4, wherein the joint-motor controller further comprises a gravity compensator, the gravity compensator calculates a gravity compensation torque applied to each robot arm according to an angle of each joint, a mass and a length of each link of the robot arm, and distances between mass-centers of each link and joint.

8. A robot arm operating method, comprising:
arranging a sensing region on a peripheral area around a robot arm to detect a position of an object in the sensing region, and determining whether the object enters a predetermined operating space, wherein the sensing region is formed by a mat or an array of pressure sensors;
setting a working range and a working mode of the robot arm according to which operating space the object has entered, and outputting a motor driving signal to the robot arm according to the working mode of the robot arm;
arranging a pressure sensing module on the robot arm to detect whether the object hits or touches the robot arm;
calculates a friction compensation torque, by a friction compensator, applied to each joint according to a rotation speed of each joint of the robot arm when generating a set of motor torque signals for moving the robot arm according to an operation command; and
emitting a stop signal to the robot arm to stop the robot arm when it is detected that the object hits or touches the robot arm.

9. The robot arm operating method according to claim 8, further comprises:
switching an operating mode of the robot arm to select whether to enter a lead-through mode or to exit a stop mode when the robot arm stops.

10. The robot arm operating method according to claim 8, wherein in the step of setting the working range and the working mode of the robot arm, a relationship table containing the relationship between the operating space of the sensing region and speed of the robot arm, and containing the relationship between the operating space of the sensing region and torque of the robot arm is pre-stored, and the operating method further comprises:
when it is determined that the operating space the object has entered is separated from the robot arm by a distance, selecting a corresponding value between the operating space the object has entered and the speed or the torque of the robot arm from the relationship table according to the distance, and controlling a maximum moving speed or a maximum output torque of the robot arm according to the corresponding value.

11. The robot arm operating method according to claim 9, wherein after the robot arm enters the lead-through mode, the operating method further comprises:
arranging a touch-sensing surface on an end effector of the robot arm to detect the operation command applied to the touch-sensing surface;
generating a set of joint angle signals according to the moving trajectory of the robot arm, and storing the set of joint angle signals; and
converting the set of joint angle signals into the motor driving signal capable of reproducing the moving trajectory of the robot arm.

* * * * *